United States Patent
Han et al.

(10) Patent No.: US 7,469,349 B2
(45) Date of Patent: Dec. 23, 2008

(54) COMPUTER SYSTEM AND METHOD OF SIGNAL TRANSMISSION VIA A PCI-EXPRESS BUS

(75) Inventors: Chih-Cheng Han, Taipei (TW);
Ming-Jiun Chang, Taipei (TW);
Hsuan-Ching Chao, Taipei (TW);
Chung-Hong Lai, Taipei (TW)

(73) Assignee: NVIDIA Corporation, Santa Clara, CA (US)

( * ) Notice: Subject to any disclaimer, the term of this patent is extended or adjusted under 35 U.S.C. 154(b) by 404 days.

(21) Appl. No.: 11/315,170

(22) Filed: Dec. 23, 2005

(65) Prior Publication Data
US 2006/0212731 A1 Sep. 21, 2006

(30) Foreign Application Priority Data
Mar. 15, 2005 (JP) .................... 94107919

(51) Int. Cl.
*G06F 1/26* (2006.01)
(52) U.S. Cl. .................... 713/300; 713/320; 713/323
(58) Field of Classification Search .................. 713/300, 713/320, 323
See application file for complete search history.

(56) References Cited

U.S. PATENT DOCUMENTS

| | | | | |
|---|---|---|---|---|
| 6,065,122 A | * | 5/2000 | Wunderlich et al. | 713/320 |
| 6,085,330 A | * | 7/2000 | Hewitt et al. | 713/322 |
| 6,247,086 B1 | * | 6/2001 | Allingham | 710/314 |
| 6,560,712 B1 | * | 5/2003 | Arends et al. | 713/320 |
| 7,017,054 B2 | * | 3/2006 | Schuckle et al. | 713/300 |
| 2005/0039063 A1 | * | 2/2005 | Hsu et al. | 713/324 |
| 2005/0132236 A1 | * | 6/2005 | Srinivasan et al. | 713/300 |

FOREIGN PATENT DOCUMENTS

CN 1492299 A 4/2004

OTHER PUBLICATIONS

English Translation of CN 1492299A.

* cited by examiner

*Primary Examiner*—Nitin C Patel
(74) *Attorney, Agent, or Firm*—Patterson & Sheridan, LLP

(57) ABSTRACT

A computer system and a method of signal transmission via a PCI-Express bus is provided for transmitting a power-saving signal among a plurality of peripheral devices. For the peripheral devices coupled with the system chips can enter a power-saving mode successfully, a signal snooping and blocking manners are introduced into the system chips. The present invention is to improve on a problem that the system chips cannot enter the power-saving mode simultaneously since the system chips don't set any power-management unit therein.

20 Claims, 6 Drawing Sheets

COMPUTER SYSTEM AND METHOD OF SIGNAL TRANSMISSION VIA A PCI-EXPRESS BUS

BACKGROUND OF THE INVENTION

1. Field of the Invention

A computer system and method of signal transmission via a PCI-Express bus, and more particularly the snooping and blocking processes are introduced to the peripheral devices coupled with the system chips can enter a power-saving mode smoothly.

2. Description of Related Art

Components and the peripheral devices perform in a computer system by the signals transmission thereof. Where a bus, such as peripheral component interconnect (PCI), accelerated graphics port (AGP), is used to transmit digital data stream. Also, a central processing unit (CPU) uses the bus to connect with a South/North Bridge chip or the system memory therein, and a plurality of peripheral devices or the components of the computer system couple to the bus, thereby transmitting signals or data.

Reference is made to FIG. 1, where a computer system couples to a plurality of peripheral devices a, b, c via a PCI bus 16. Under a low power mode supported by the computer system, a PCI cycle command will be executed as a CPU 10 therein receives a power-saving command. While a North Bridge chip 11 and a South Bridge chip 12 transmit the PCI cycle command via the PCI bus 16, the peripheral devices a, b, c will enter the power-saving mode activated by a basic I/O system (BIOS), and even a system memory 13 or a graphic chip 14 will enter the power-saving mode via each proper transmission bus as well. U.S. Pat. No. 6,357,013 discloses a circuit for setting a computer system bus signals to predetermined states in low power mode, but the transmission between the peripheral device and the its bus is still under limitation of the current PCI bus bandwidth. Thus, the South Bridge chip and its coupled peripheral devices need to share merely one pipe with transmission bandwidth of 133 MB/s. If a big-sized file is sent there between, the computer system rate will be degraded since the mentioned data is transmitted in a sequence. If the newly developed device with serial ATA (SATA) interface or a gigabit network with high-transfer transmission rate performs under the PCI standard, the transmission rate will be degraded due to the less bandwidth.

Different from a multi-drop parallel bus technology has been incorporated into the current used PCI bus, PCI-Express further incorporates a switching peer-to-peer sequential transmission technology. In the process of transmission, the physical layer of the PCI-Express bus is composed of a set of single-task lane having a transmit-end and a receive-end. Wherein, each PCI-Express uses its own lane to communicate with the North/South Bridge chip independently rather than use the structure having a common bus. Not only the single-task lane of the PCI-Express can exclude the interference in data transmission, but also each data has the performance privilege of the first priority. Therefore, according to the above-mentioned structure of the PCI-Express standard, rather than the current used PCI bus, PCI-Express will be the main choice for computer system bus.

The PCI-Express standard defines a L2 and L3 power mode for supplying power to the peripheral devices. Where the L2 power mode is defined as both a main power and a reference clock of the computer system are excluded from the power supply except for an auxiliary power. The auxiliary power remains as supplying the lowest power consumption, in which the lowest power mode has a wake-up function for waking the computer system up from a suspend mode. Next, the L3 power mode is defined as both the main power and the reference clock are excluded from the computer system, meanwhile, the auxiliary power is disable either. In the L3 power mode, the computer system can not be waked up until rebooting or resetting.

In prior arts, the L2 or L3 power mode is defined since the power-saving mode of the computer system is initialized after accomplishing the signal transmitting process between the CPU and the South Bridge chip. In the meantime, an OS (operation system) direct power management (OSPM) within the computer system is initializes a preparation for transferring to the power-saving mode since an advanced configuration and power interface (ACPI) installed in the South Bridge chip, so as to drive the peripheral devices using the PCI-Express bus coupled with the South Bridge chip into a specific power-saving mode. In addition, the peripheral devices, such as a graphic card, high-speed network card, coupled with the North Bridge chip don't have any mechanism to enter a power-saving mode in the prior arts.

SUMMARY OF THE INVENTION

A computer system and method for transmitting signal via a PCI-Express bus is provided in a preferred embodiment of the present invention. The signal transmitting method is applied to the signal transmission between the computer and the peripheral devices via the PCI-Express bus. A snooping and a blocking processes are introduced to the peripheral devices can enter a power-saving mode smoothly so as to solve that the peripheral devices of the computer system cannot enter the power-saving mode simultaneously since there is no power management unit installed inside the system chips.

The method of signal transmission via the PCI-Express bus of the preferred embodiment comprises the steps of a CPU transmits a first command to a second system chip in the beginning, and a first system chip snoops the system command transmitted from the central processing unit to the second system chip, afterward, the CPU transmits the second command to the second system chip. Next, the first system chip blocks the second command, and the first system chip executes the second command. After that, the first system chip passes the second command to the second system chip, and subsequently the second system chip executes the second command.

The other preferred embodiment of the present invention comprises the steps of transmitting a first command from a central processing unit to a second system chip in the first step. Then the second system chip executes the first command, and responds the first command to the central processing unit afterward. Next, a first system chip snoops the responded first command from the second system chip, and drives the peripheral devices being ready into a power-saving mode. Next, the CPU further transmits a second command, which is blocked by the first system chip. After the mentioned peripheral devices enter the power-saving mode, the first system chip passes the second command to the second system chip, and the second system chip executes the second command subsequently.

The next preferred embodiment comprises the steps of determining whether the computer system enters a power-saving mode by a central processing unit in the first step, then the CPU transmits a Ready-Enter-Power-Saving-Mode command to a second system chip. Next, the first system chip snoops the Ready-Enter-Power-Saving-Mode command transmitted from the central processing unit, and drives its coupled peripheral device being ready to the power-saving mode. After the second system chip receives the system command, and drives the peripheral device coupled with the second system chip being ready to the power-saving mode.

After receiving the system command, the second system chip responds the CPU. Then the CPU transmits a Start-Enter-Power-Saving-Mode command. The first system chip blocks the Start-Enter-Power-Saving-Mode command in the next step, and drives its coupled peripheral device into the power-saving mode. Finally, the second system chip drives the peripheral device into the power-saving mode.

From the description above, the first system chip can be a North Bridge chip, and the second system chip can be a South Bridge chip in a preferred embodiment. A snooping program or circuit is installed in the first system chip to snoop the passing system commands, and the power-saving mode command is received by a power-management-unit (PMU) in the second system chip.

In a next preferred embodiment, the snooping circuit or program installed in the first system chip is to snoop the power-saving mode command responded from the second system chip to the CPU.

BRIEF DESCRIPTION OF THE DRAWINGS

The present invention will be readily understood by the following detailed description in conjunction accompanying drawings, in which.

DETAILED DESCRIPTION OF THE PREFERRED EMBODIMENTS

To allow the Examiner to understand the technology, means and functions adopted in the present invention further, reference is made to the following detailed description and attached drawings. The Examiner shall readily understand the invention deeply and concretely from the purpose, characteristics and specification of the present invention. Nevertheless, the present invention is not limited to the attached drawings and embodiments in following description.

Conventionally, the peripheral devices of a computer system using the prior PCI bus standard can enter a power-saving mode without any response to a power-management-unit (PMU) of a central processing unit (CPU). Differently, the peripheral devices incorporating the PCI-Express bus should respond the power management signal. In practice, according to the specification of the computer system with the PCI-Express standard, only the peripheral devices coupled to a South Bridge chip with the PCI-Express standard is specified to respond the signal, and the peripheral device coupled to a North Bridge chip have not been specified how to respond the power management signal. In view of the above-mentioned object, the present invention establishes a snooping circuit or program (micro-code) in the first system chip for snooping the signals transmitted between the CPU and the system chips. Since the snooping circuit or program retrieves a power management signal from the transmitted signals, the peripheral devices coupled with the North or South Bridge chip can enter the same power mode synchronously according to the message from the signal.

Figure 1:
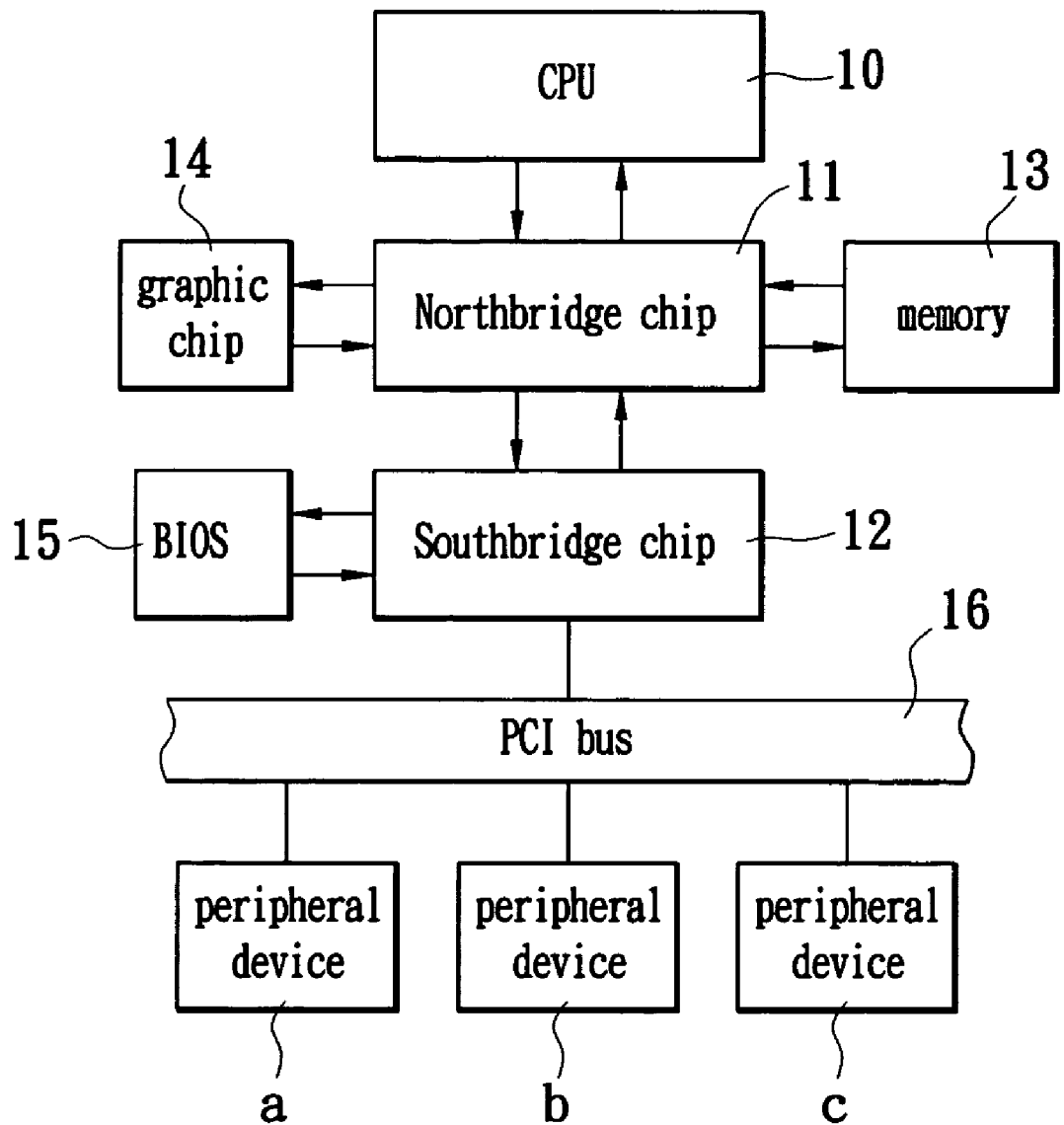
FIG. 1 is a schematic diagram illustrating a conventional computer system.
Figure 2:
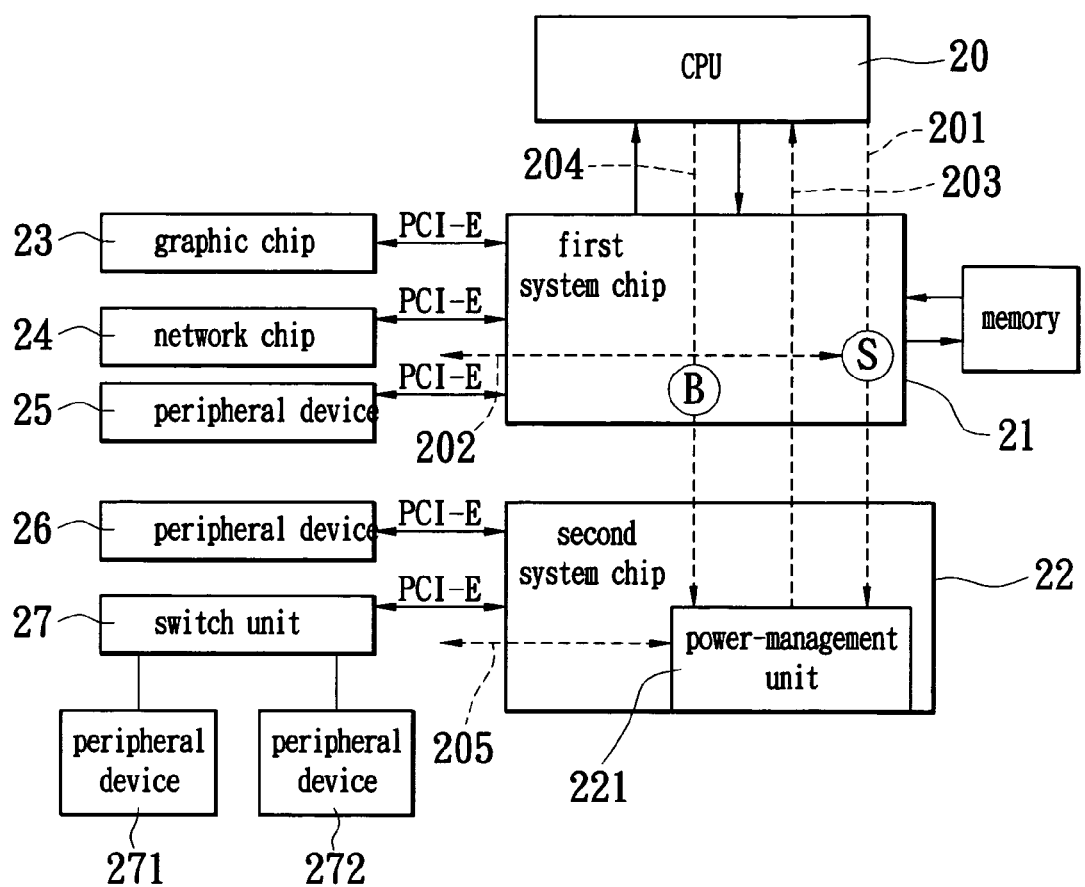
FIG. 2 shows a schematic diagram of the signal transmission of the preferred embodiment of the present invention.

Reference is made to FIG. 2, which shows a schematic diagram of the signal transmission in the preferred embodiment. A first system chip 21 coupled with a CPU 20 is one of the system chipset, like the North Bridge chip, and a second system chip 22 coupled with the first system chip 21 is another one of the system chipset, such as the South Bridge chip. The chipset of the present embodiment couples to proper peripheral devices via a PCI-Express bus. For example, the first system chip 21 at least couples to a graphic chip 23, a network chip 24 and other peripherals 25, the second system chip 22 couples to a plurality of peripherals 271, 272, 273 via a switch 27 of the PCI-Express bus, and further couples to other peripheral devices 26.

When the CPU submits a system command to the second system chip 22, the system command will pass through the circuitry of the first system chip 21. In particular, a snooping circuit or a set of micro-code is installed in the first system chip 21 for performing a snooping process in a preferred embodiment. The method of the signal transmission of the present invention is to snoop the signal passing through the first system chip 21 accordingly so as to retrieve some useful information, more particularly to snoop a power management command thereof. Where a power-management-unit (PMU) 221 is installed in the second system chip 22, thereby an advanced configuration and power interface (ACPI) therein is used to control the power mode of the plurality of peripheral devices.

Referring to the schematic diagram of the signal transmission of FIG. 2, the CPU 20 transmits a first signal 201, such as a power-saving command, to the second system chip 22. When the first signal 201 transmitted goes through the first system chip 21, the snooping process is to snoop the signal, where the action is denoted as "S" in the diagram. After the first system chip 21 has retrieved the useful signal, a second signal 202 will be transmitted to the peripherals from the first system chip 21 next. After the second system chip 22 has received the first signal 201, a third signal 203 will be transmitted to respond to the CPU 20 from the second system chip 22. The CPU 20 will acknowledge that the system command (first signal 201) has transmitted since it has received the responded third signal 203, then a fourth signal 204 will be transmitted to the second system chip 22 afterward.

When the fourth signal 204 transmitted goes through the first system chip 21, the blocking process is to block the signal, where the action is denoted as "B" in FIG. 2. After accomplishing the execution of the fourth signal 204 in the first system chip 21, the fourth signal 204 will be passed to the second system chip 22. Ends the signal transmitting process.

Figure 3:
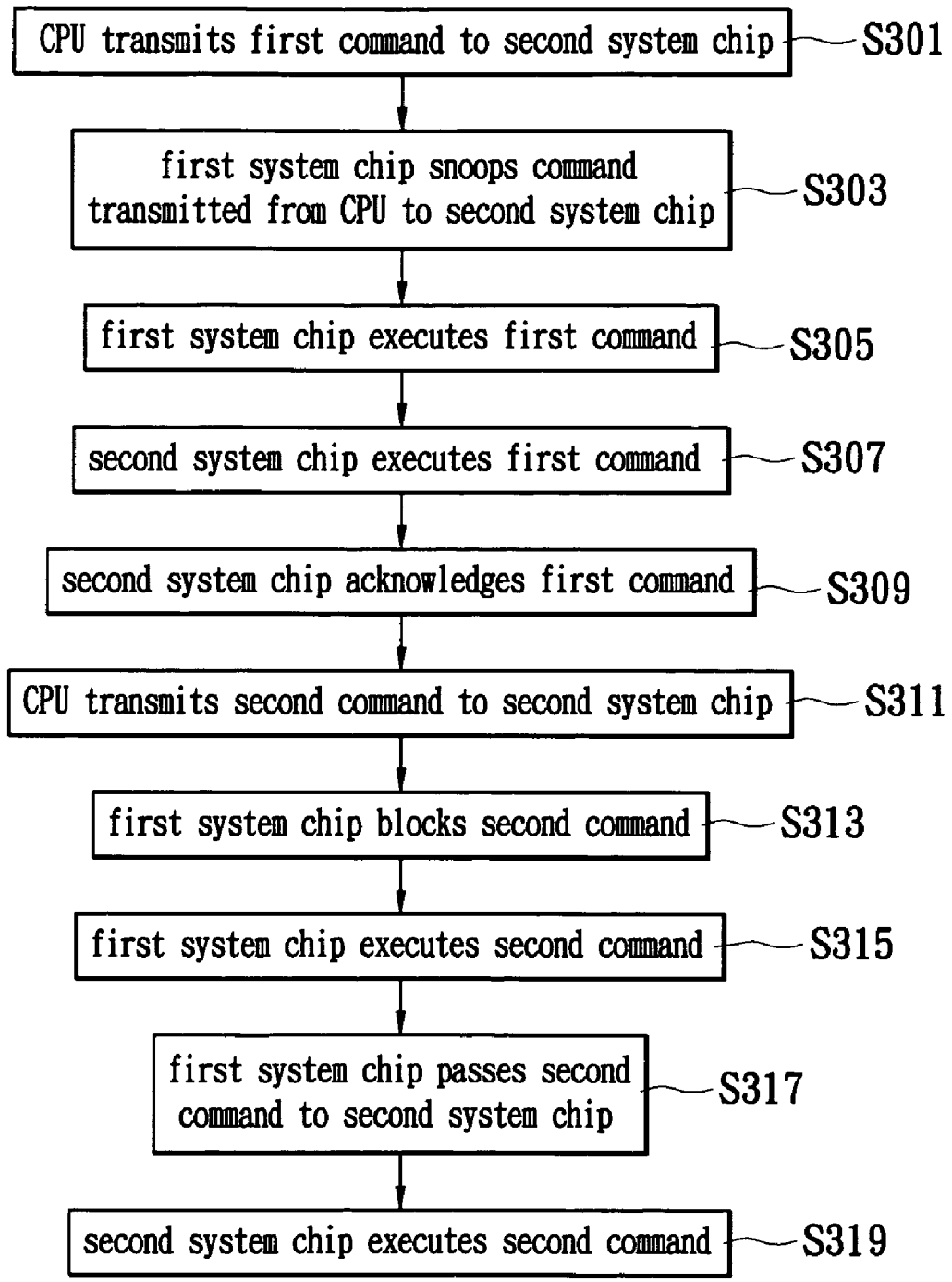
FIG. 3 is a flowchart illustrating the method of signal transmission of the present invention.

FIG. 3 shows a schematic diagram of a signal transmission via the PCI-Express bus incorporated into the computer system and its peripherals.

A snooping micro-code or program installed into the above-mentioned first system chip, such as a North Bridge chip in the preferred embodiment, is used to snoop the system command transmitted from the CPU to the second system chip.

To begin, the CPU transmits a first command to a second system chip (step S301), in the meantime, the first system chip snoops the first command transmitted from the central processing unit (CPU) using a snooping circuit or program (step S303). After that, the first system chip executes the snooped first command (step S305).

When the first command reaches the second system chip, the second system chip executes the first command (step S307), and responds the first command to the CPU (step S309).

Next, the CPU further transmits a second command to the second system chip (step S311). Meanwhile, the first system chip blocks the second command (step S313), and the first system chip executes the blocked second command (step S315). After that, the first system chip passes the second command to the second system chip (step S317) and the second system chip executes the second command (step S319).

As the steps shown in FIG. 3 corresponding to the diagram of FIG. 2, the first signal 201 shown in FIG. 2 is equivalent to the first command transmitted from the CPU in FIG. 3. Where the first command indicates a Start-Enter-Power-Saving-Mode command in the preferred embodiment. Moreover, the second signal 202 is a system command transmitted from the CPU to the second system chip, and simultaneously snooped by the first system chip. The third signal 203 is equivalent to the command responded from the first system chip to the CPU in step S309. Similarly, the fourth signal 204 is the second command indicating an Enter-Power-Saving-Mode command transmitted from the central processing unit to the second system chip. At last, a fifth signal 205 is used to inform that the peripheral devices enter a power-saving mode, so as to drive the peripheral devices coupled with the North/South chip into the power-saving mode.

Figure 4:
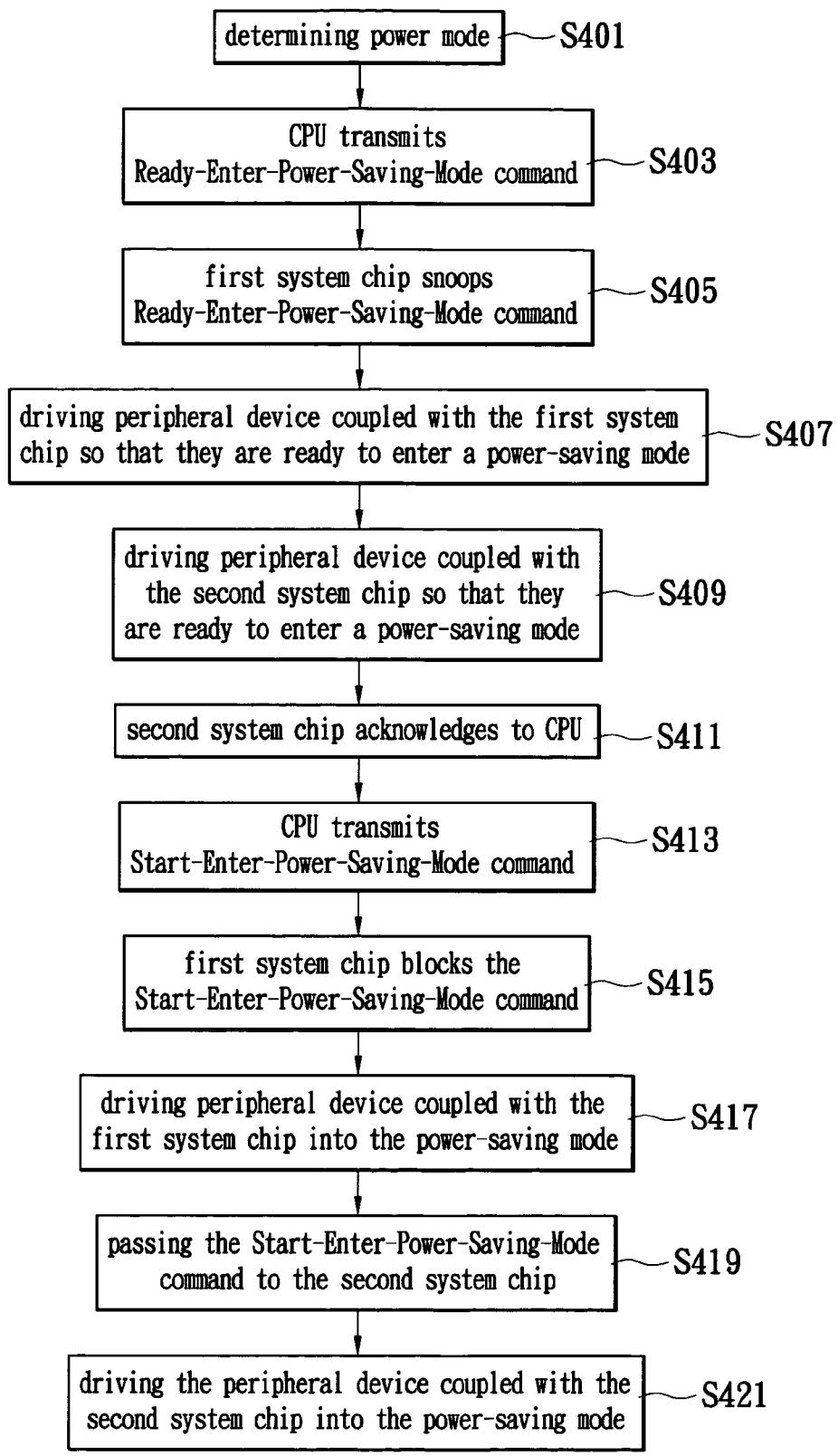
FIG. 4 is a flowchart illustrating the method of signal transmission of the present invention.

FIG. 4 is a flowchart of the preferred embodiment of the present invention.

Under the operation of the computer system, the snooping circuit or the snooping program installed in the first system chip is to snoop the system command transmitted from the CPU to the second system chip anytime.

First, the CPU determines whether the peripheral devices enter a power mode or not (step S401). The determination can be done by a computer's user, or the program in an operation system of the computer can determine what the mode can be entered base on some system conditions, such as system usage, power-consuming and suspending time, wherein the power-saving mode can have a plurality of levels accordingly.

After the determination, the CPU transmits a Ready-Enter-Power-Saving-Mode command to the second system chip (step S403). At this moment, first system chip, such as the North Bridge chip, snoops the Ready-Enter-Power-Saving-Mode command transmitted from the CPU to the second system using the installed snooping program or circuit doing the same (step S405). After the first system chip snoops the system command transmitted through the circuitry thereof, then the first system chip drives at least one coupled peripheral device being ready to a power-saving mode (step S407).

Simultaneously, the system command, such as the Ready-Enter-Power-Saving-Mode command, is received by the power-management-unit in the second system chip, then the second system chip drives at least one peripheral device being ready to a power-saving mode (step S409), and the second system chip responds to CPU in next step S411.

Since the CPU receives the responded signal, the computer system will start to enter the power-saving mode, i.e. the CPU transmits Start-Enter-Power-Saving-Mode command to the system chips (step S413).

At this moment, the first system chip blocks the Start-Enter-Power-Saving-Mode command transmitted from the CPU after the first system chip snoops the command using the snooping circuit or program (step S415).

After that, the first system chip drives its coupled peripheral devices into the power-saving mode (step S417), and passes the blocked Start-Enter-Power-Saving-Mode command to the PMU of the second system chip (step S419). Then the peripheral devices coupled with the second system chip are driven into the power-saving mode (step S421).

Figure 5:
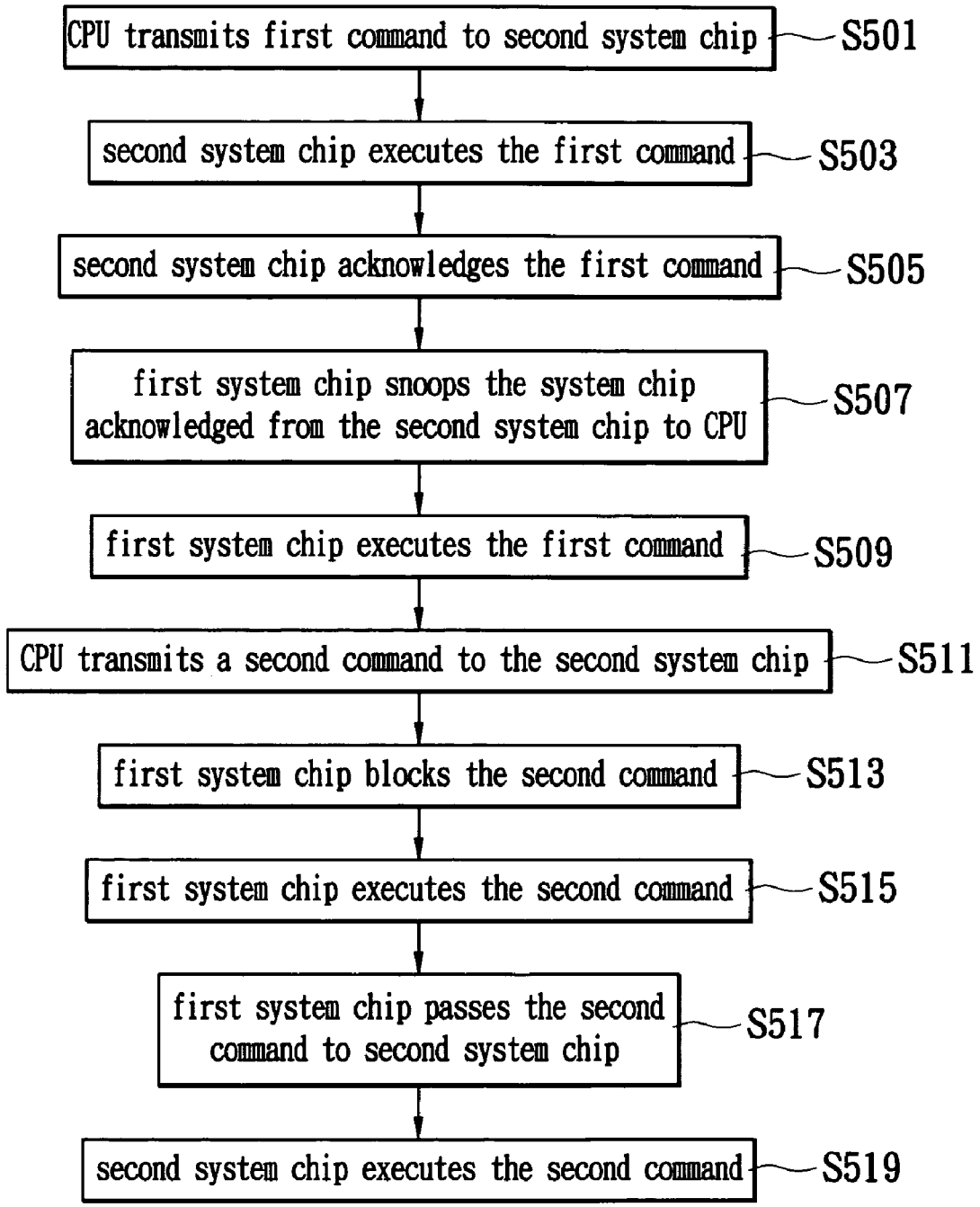
FIG. 5 is a flowchart illustrating the method of signal transmission of the present invention.

The aforementioned embodiment describes a snooping process performed by the first system chip, which snoops the system command transmitted from the CPU to the second system chip. In another preferred embodiment, the first system chip snoops the system command responded from the second system chip to the CPU, as shown in the flowchart of FIG. 5.

To begin, the CPU transmits a first command to the second system chip (step S501). When the second system chip receives the first command, then executes the first command (step S503), and responds the first command to the CPU according to the PCI-Express standard (step S505).

At this moment, the first system chip snoops the system chip responded from the second system chip to CPU (step S507), and executes the first command (step S509).

After that, the CPU transmits a second command to the second system chip (step S511). Meanwhile, the first system chip blocks the transmitted second command (step S513), and executes the second command (step S515).

After the execution, the first system chip passes the second command to second system chip (step S517), and then the second system chip executes the second command after receiving the command (step S519).

Figure 6:
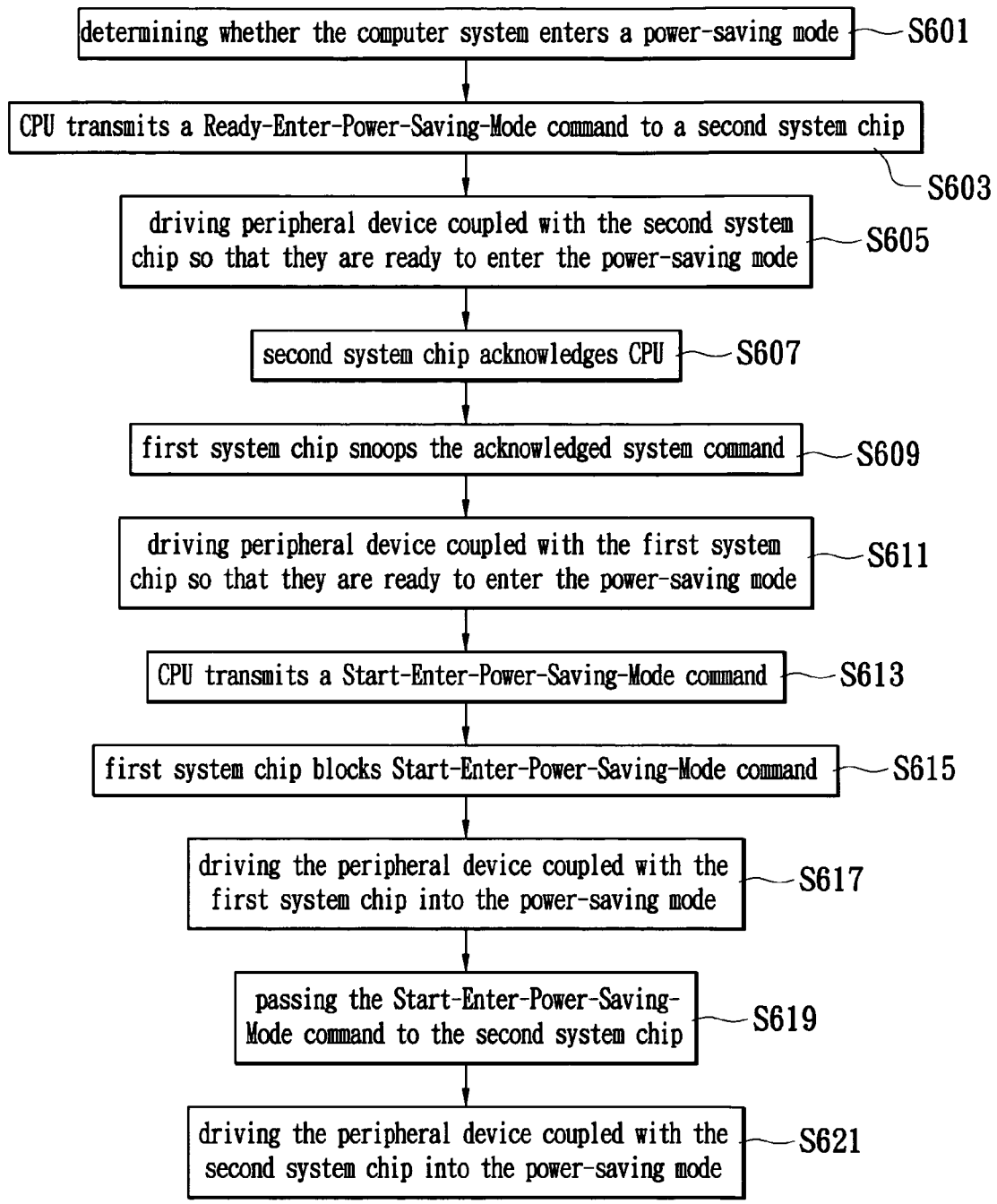
FIG. 6 is a flowchart illustrating the method of signal transmission of the present invention.

According to the above-mentioned description, the first system chip snoops the system command responded from the second system chip to the CPU using the snooping circuit or program, wherein the preferred embodiment of the process for the signal transmission is shown in FIG. 6.

During the operation of the computer system, the CPU determines whether the computer system enters a power-saving mode based on some conditions such as system usage, power-consuming status or the like (step S601).

If the computer system is ready to entering a power-saving mode, the CPU transmits a Ready-Enter-Power-Saving-Mode command (first command) to a second system chip such as South Bridge chip (step S603). When the second system chip receives the system command, and then drives its coupled peripheral devices being ready to the power-saving mode (step S605).

Next, the second system chip responds the command to the CPU (step S607). In the Meantime, the first system chip snoops the responded system command (step S609), and drives its coupled peripheral devices being ready to the power-saving mode in next step S611.

After that, the CPU transmits a Start-Enter-Power-Saving-Mode command (second command) to the second system chip (step S613). The first system chip blocks the Start-Enter-Power-Saving-Mode command after the transmission (step S615), and drives the peripheral devices into the power-saving mode (step S617).

Then, the first system chip passes the Start-Enter-Power-Saving-Mode command to the second system chip after the peripheral devices coupled with the first system chip enter the power-saving mode (step S619).

Subsequently, the peripheral devices coupled with the second system chip are driven into the power-saving mode (step S621).

The snooping and a blocking processes of the present invention described above are introduced to the peripheral devices can enter a power-saving mode smoothly so as to solve that the peripheral devices of the computer system cannot enter the power-saving mode simultaneously in the PCI-Express standard.

The many features and advantages of the present invention are apparent from the written description above and it is intended by the appended claims to cover all. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of signal transmission via a PCI-Express bus of a computer system, comprising:

transmitting a first command, where a central processing unit transmits the first command to a second system chip;

snooping the first command, where a first system chip snoops the system command transmitted from the central processing unit to the second system chip;

transmitting a second command, where the central processing unit transmits the second command to the second system chip;

blocking the second command, where the first system chip blocks the second command;

executing the second command by the first system chip;

passing the second command to the second system chip; and executing the second command by the second system chip.

2. The method as recited in claim 1, wherein the step for snooping is performed by a snooping program or a snooping circuit installed in the first system chip.

3. The method as recited in claim 1, wherein after the second system chip receives the first command, the second system chip responds to the central processing unit.

4. The method as recited in claim 1, wherein the first command indicates a Start-Enter-Power-Saving-Mode command.

5. The method as recited in claim 1, wherein the second command indicates an Enter-Power-Saving-Mode command transmitted from the central processing unit to the second system chip.

6. The method as recited in claim 1, wherein after the first system chip snoops the first command, the first command is executed at the moment.

7. The method as recited in claim 1, wherein after the second system chip receives the first command, the first command is executed at the moment.

8. A method of signal transmission via a PCI-Express bus of a computer system, the method is applied to a power-saving signal transmission between a computer system and at least one peripheral device employing a PCI-Express bus, comprising:

determining whether the computer system enters a power-saving mode by a central processing unit;

transmitting a Ready-Enter-Power-Saving-Mode command to a second system chip by the central processing unit;

snooping a system command transmitted from the central processing unit to the second system chip by a first system chip;

driving a first peripheral device coupled with the first system chip being ready to the power-saving mode after the first system chip snoops the Ready-Enter-Power-Saving-Mode command;

driving a second peripheral device coupled with the second system chip being ready to the power-saving mode;

transmitting a Start-Enter-Power-Saving-Mode command by the central processing unit;

blocking the Start-Enter-Power-Saving-Mode command in the first system chip;

driving the first peripheral device coupled with the first system chip into the power-saving mode;

passing the Start-Enter-Power-Saving-Mode command to the second system chip; and driving the second peripheral device coupled with the second system chip into the power-saving mode.

9. The method as recited in claim 8, wherein the step for snooping the system command is performed by a snooping program or a snooping circuit installed in the first system chip.

10. The method as recited in claim 8, wherein the power-saving command is receiving by a power-management unit of the second system chip.

11. The method as recited in claim 8, wherein after the second system chip receives the Ready-Enter-Power-Saving-Mode command, the second system chip responds to the central processing unit, and the central processing unit transmits Start-Enter-Power-Saving-Mode command.

12. A method of signal transmission via a PCI-Express bus of a computer system, comprising:

transmitting a first command, where a central processing unit transmits the first command to a second system chip;

executing the first command;

responding the first command to the central processing unit;

snooping the responded first command, where a first system chip snoops the first command responded from the second system chip to the central processing unit;

transmitting a second command, where the central processing unit transmits the second command to the second system chip;

blocking the second command, where the first system chip blocks the second command;

executing the second command by the first system chip;

passing the second command to the second system chip; and executing the second command by the second system chip.

13. The method as recited in claim 12, wherein the step for snooping the responded first command is performed by a snooping program or a snooping circuit installed in the first system chip.

14. The method as recited in claim 12, wherein the first command indicates a Start-Enter-Power-Saving-Mode command.

15. The method as recited in claim 12, wherein the second command indicates an Enter-Power-Saving-Mode command transmitted from the central processing unit to the second system chip.

16. The method as recited in claim 12, wherein after the first system chip snoops the first command, the first command is executed by the first system chip.

17. The method as recited in claim 12, wherein after the second system chip receives the first command, the first command is executed by the second system chip.

18. A method of signal transmission via a PCI-Express bus of a computer system, the method is applied to a power-saving signal transmission between a computer system and a at least one peripheral device employing a PCI-Express bus, comprising:

determining whether the computer system enters a power-saving mode by a central processing unit;

transmitting a Ready-Enter-Power-Saving-Mode command to a second system chip by the central processing unit;

driving a first peripheral device coupled with the second system chip being ready to the power-saving mode;

responding the Ready-Enter-Power-Saving-Mode command to the central processing unit;

snooping the Ready-Enter-Power-Saving-Mode command responded from the second system chip to the central processing unit by a first system chip;

driving a second peripheral device coupled with the first system chip being ready to the power-saving mode after the first system chip snoops the Ready-Enter-Power-Saving-Mode command;

transmitting a Start-Enter-Power-Saving-Mode command by the central processing unit;

blocking the Start-Enter-Power-Saving-Mode command in the first system chip;

driving the second peripheral device coupled with the first system chip into the power-saving mode;

passing the Start-Power-Saving-Mode command to the second system chip; and driving the first peripheral device coupled with the second system chip into the power-saving mode.

19. The method as recited in claim 18, wherein the step for snooping the system command is performed by a snooping program or a snooping circuit installed in the first system chip.

20. The method as recited in claim 18, wherein the power-saving command is received by a power-management unit of the second system chip.

* * * * *

UNITED STATES PATENT AND TRADEMARK OFFICE
CERTIFICATE OF CORRECTION

PATENT NO. : 7,469,349 B2 Page 1 of 1
APPLICATION NO. : 11/315170
DATED : December 23, 2008
INVENTOR(S) : Han et al.

It is certified that error appears in the above-identified patent and that said Letters Patent is hereby corrected as shown below:

On the Title Page, item 30, please replace "(JP)" with -- (TW) --.

Signed and Sealed this

Tenth Day of March, 2009

JOHN DOLL
*Acting Director of the United States Patent and Trademark Office*